United States Patent

[11] 3,544,773

[72] Inventor John G. Peddie
San Antonio, Texas

[21] Appl. No. 657,936
[22] Filed Aug. 2, 1967
[45] Patented Dec. 1, 1970
[73] Assignee H. Dell Foster Co.
San Antonio, Texas
a corporation of Texas

[54] REVERSIBLE BINARY CODED DECIMAL SYNCHRONOUS COUNTER CIRCUITS
11 Claims, 16 Drawing Figs.

[52] U.S. Cl. .......... 235/92, 307/222; 328/44
[51] Int. Cl. .......... G06m 3/14
[50] Field of Search .......... 235/92(66); 328/44; 307/222

[56] References Cited

UNITED STATES PATENTS 3,121,787 2/1964 Bordelon, Jr. .......... 235/92

OTHER REFERENCES

HEILWEIL " BI-DIRECTIONAL BCD COUNTER" JUNE 61, FBM TECHNICAL DISCLOSURE BULLETIN VOL 4 NO 1 JUNE 1961 p 44-45

ROSENBERG " BIDIRECTIONAL COUNTER" IBM TECHNICAL DISCLOSURE BULLETIN VOL 3 NO 8 JAN 1961 p17-18

*Primary Examiner*—Maynard R. Wilbur
*Assistant Examiner*—Joseph M. Thesz, Jr.
*Attorney*—Watson, Cole, Grindle & Watson

ABSTRACT: This invention relates to binary coded decimal counter circuitry to count pulsed information in either a forward or reverse direction in response to forward and reverse count control signals. Gated logic steering means are provided for applying auxiliary switching signals to selected input gates of the two-state switching and memory elements in response to selected output signals from the two-state elements to reduce the bidirectional carry propagation delay time thereby enabling the counter to approach the speed represented by the switching time of the individual two-state elements.

FIG. 1
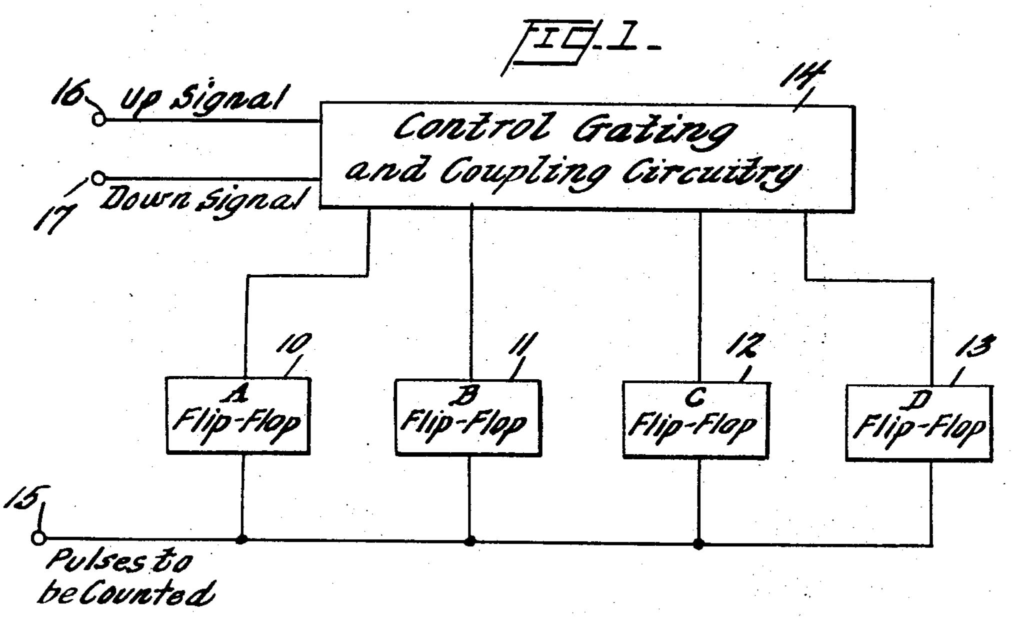
FIG. 2
18
| Stage | Binary Weight | 0 | 1 | 2 | 3 | 4 | 5 | 6 | 7 | 8 | 9 | 0 |
|---|---|---|---|---|---|---|---|---|---|---|---|---|
| A | $2^0$ | 0 | 1 | 0 | 1 | 0 | 1 | 0 | 1 | 0 | 1 | 0 |
| B | $2^1$ | 0 | 0 | 1 | 1 | 0 | 0 | 1 | 1 | 0 | 0 | 0 |
| C | $2^2$ | 0 | 0 | 0 | 0 | 1 | 1 | 1 | 1 | 0 | 0 | 0 |
| D | $2^3$ | 0 | 0 | 0 | 0 | 0 | 0 | 0 | 0 | 1 | 1 | 0 |
(Decimal Equivalent: 0 1 2 3 4 5 6 7 8 9 0)
FIG. 3a
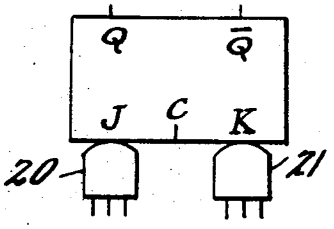
FIG. 3b
J-K Operation
| | | | | |
|---|---|---|---|---|
| Qn-1 | 0 | 1 | 0 | 1 |
| Q | 0 | 0 | 1 | 1 |
| Jq | 0 | X | 1 | X |
| Kq | X | 1 | X | 0 |
Where - Qn-1 is past condition of stage
Q is desired condition
Jq is required input signal
Kq is required input signal
X means undefined
Inventor
John G. Peddie,
BY Watson, Cole, Grindle & Watson
ATTORNEYS

FIG. 4a

B Stage Forward

| | 0 | 1 | 2 | 3 | 4 | 5 | 6 | 7 | 8 | 9 |
|---|---|---|---|---|---|---|---|---|---|---|
| $B_{n-1}$ | 0 | 0 | 1 | 1 | 0 | 0 | 1 | 1 | 0 | 0 |
| B | 0 | 1 | 1 | 0 | 0 | 1 | 1 | 0 | 0 | 0 |
| $J_{bf}$ | 0 | 1 | X | X | 0 | 1 | X | X | 0 | 0 |
| $K_{bf}$ | X | X | 0 | 1 | X | X | 0 | 1 | X | X |

Minimum Logic Equations $J_{bf} = A\bar{D}$ $K_{bf} = A$

FIG. 4b

B Stage Reverse

| | 0 | 1 | 2 | 3 | 4 | 5 | 6 | 7 | 8 | 9 |
|---|---|---|---|---|---|---|---|---|---|---|
| $B_{n-1}$ | 0 | 0 | 1 | 1 | 0 | 0 | 1 | 1 | 0 | 0 |
| B | 0 | 0 | 0 | 1 | 1 | 0 | 0 | 1 | 1 | 0 |
| $J_{br}$ | 0 | 0 | X | X | 1 | 0 | X | X | 1 | 0 |
| $K_{br}$ | X | X | 1 | 0 | X | X | 1 | 0 | X | X |

$J_{br} = \bar{A}D + \bar{A}C$ $K_{br} = \bar{A}$

FIG. 5a

C Stage Forward

| | 0 | 1 | 2 | 3 | 4 | 5 | 6 | 7 | 8 | 9 |
|---|---|---|---|---|---|---|---|---|---|---|
| $C_{n-1}$ | 0 | 0 | 0 | 0 | 1 | 1 | 1 | 1 | 0 | 0 |
| C | 0 | 0 | 0 | 1 | 1 | 1 | 1 | 0 | 0 | 0 |
| $J_{cf}$ | 0 | 0 | 0 | 1 | X | X | X | X | 0 | 0 |
| $K_{cf}$ | X | X | X | X | 0 | 0 | 0 | 1 | X | X |

Minimum Logic Equations $J_{cf} = AB$ $K_{cf} = AB$

FIG. 5b

C Stage Reverse

| | 0 | 1 | 2 | 3 | 4 | 5 | 6 | 7 | 8 | 9 |
|---|---|---|---|---|---|---|---|---|---|---|
| $C_{n-1}$ | 0 | 0 | 0 | 0 | 1 | 1 | 1 | 1 | 0 | 0 |
| C | 0 | 0 | 0 | 0 | 0 | 1 | 1 | 1 | 1 | 0 |
| $J_{cr}$ | 0 | 0 | 0 | 0 | X | X | X | X | 1 | 0 |
| $K_{cr}$ | X | X | X | X | 1 | 0 | 0 | 0 | X | X |

$J_{cr} = \bar{A}D$ $K_{cr} = \bar{A}\bar{B}$

FIG. 6a

D Stage Forward

| | 0 | 1 | 2 | 3 | 4 | 5 | 6 | 7 | 8 | 9 |
|---|---|---|---|---|---|---|---|---|---|---|
| $D_{n-1}$ | 0 | 0 | 0 | 0 | 0 | 0 | 0 | 0 | 1 | 1 |
| D | 0 | 0 | 0 | 0 | 0 | 0 | 0 | 1 | 1 | 0 |
| $J_{df}$ | 0 | 0 | 0 | 0 | 0 | 0 | 0 | 1 | X | X |
| $K_{df}$ | X | X | X | X | X | X | X | X | 0 | 1 |

Minimum Logic Equations $J_{df} = ABC$ $K_{df} = A$

FIG. 6b

D Stage Reverse

| | 0 | 1 | 2 | 3 | 4 | 5 | 6 | 7 | 8 | 9 |
|---|---|---|---|---|---|---|---|---|---|---|
| $D_{n-1}$ | 0 | 0 | 0 | 0 | 0 | 0 | 0 | 0 | 1 | 1 |
| D | 1 | 0 | 0 | 0 | 0 | 0 | 0 | 0 | 0 | 1 |
| $J_{dr}$ | 1 | 0 | 0 | 0 | 0 | 0 | 0 | 0 | X | X |
| $K_{dr}$ | X | X | X | X | X | X | X | X | 1 | 0 |

$J_{dr} = \bar{A}\bar{B}\bar{C}$ $K_{dr} = \bar{A}$

INVENTOR

John G. Peddie,

BY Watson, Cole, Grindle + Watson

ATTORNEYS

FIG. 7a

Decimal Numbers →

| Stage | 0 | 1 | 2 | 3 | 4 | 5 | 6 | 7 | 8 | 9 |
|---|---|---|---|---|---|---|---|---|---|---|
| A | 0 | 1 | 0 | 1 | 0 | 1 | 0 | 1 | 0 | 1 |
| B | 0 | 0 | 1 | 1 | 0 | 0 | 1 | 1 | 0 | 0 |
| C | 0 | 0 | 0 | 0 | 1 | 1 | 1 | 1 | 0 | 0 |
| D | 0 | 0 | 0 | 0 | 0 | 0 | 0 | 0 | 1 | 1 |

FIG. 7b

| | | | | | | | | | | |
|---|---|---|---|---|---|---|---|---|---|---|
| 1 | 1 | 1 | 1 | 1 | 1 | 1 | 1 | 1 | 0 | $C_{of}$ |
| 0 | 1 | 1 | 1 | 1 | 1 | 1 | 1 | 1 | 1 | $C_{or}$ |

FIG. 7c

Original Logic Equations

| | | | | | | | | | | |
|---|---|---|---|---|---|---|---|---|---|---|
| $\bar{A}\bar{D}F$ $J_{bf}$ | 0 | 1 | 0 | 1 | 0 | 1 | 0 | 1 | 0 | 0 |
| $(\bar{A}C+\bar{A}D)R$ $J_{br}$ | 0 | 0 | 0 | 0 | 1 | 0 | 1 | 0 | 1 | 0 |
| $AF$ $K_{bf}$ | 0 | 1 | 0 | 1 | 0 | 1 | 0 | 1 | 0 | 1 |
| $\bar{A}R$ $K_{br}$ | 1 | 0 | 1 | 0 | 1 | 0 | 1 | 0 | 1 | 0 |
| $ABF$ $J_{cf}$ | 0 | 0 | 0 | 1 | 0 | 0 | 0 | 1 | 0 | 0 |
| $\bar{A}DR$ $J_{cr}$ | 0 | 0 | 0 | 0 | 0 | 0 | 0 | 0 | 1 | 0 |
| $ABF$ $K_{cf}$ | 0 | 0 | 0 | 1 | 0 | 0 | 0 | 1 | 0 | 0 |
| $\bar{A}\bar{B}R$ $K_{cr}$ | 1 | 0 | 0 | 0 | 1 | 0 | 0 | 0 | 1 | 0 |
| $ABCF$ $J_{df}$ | 0 | 0 | 0 | 0 | 0 | 0 | 0 | 1 | 0 | 0 |
| $\bar{A}\bar{B}\bar{C}R$ $J_{dr}$ | 1 | 0 | 0 | 0 | 0 | 0 | 0 | 0 | 1 | 0 |
| $AF$ $K_{df}$ | 0 | 1 | 0 | 1 | 0 | 1 | 0 | 1 | 0 | 1 |
| $\bar{A}R$ $K_{dr}$ | 1 | 0 | 1 | 0 | 1 | 0 | 1 | 0 | 1 | 0 |

FIG. 7d

Adjusted Logic Equations

| | | | | | | | | | | |
|---|---|---|---|---|---|---|---|---|---|---|
| 0 | 1 | 0 | 1 | 0 | 1 | 0 | 1 | 0 | 0 | $\overline{C_{of}}(AF)$ |
| 0 | 1 | 0 | 1 | 0 | 1 | 0 | 1 | 0 | 1 | $AF$ |
| 0 | 0 | 1 | 0 | 1 | 0 | 1 | 0 | 1 | 0 | $\bar{A}R$ |
| 0 | 0 | 1 | 0 | 1 | 0 | 1 | 0 | 1 | 0 | $\overline{C_{or}}(\bar{A}R)$ |
| 0 | 1 | 0 | 1 | 0 | 1 | 0 | 1 | 0 | 1 | $AF$ |
| 1 | 0 | 1 | 0 | 1 | 0 | 1 | 0 | 1 | 0 | $\bar{A}R$ |
| 0 | 0 | 0 | 1 | 0 | 0 | 0 | 1 | 0 | 0 | $\overline{C_{of}}(ABF)$ |
| 0 | 0 | 0 | 1 | 0 | 0 | 0 | 1 | 0 | 0 | $ABF$ |
| 1 | 0 | 0 | 0 | 1 | 0 | 0 | 0 | 1 | 0 | $\bar{A}\bar{B}R$ |
| 0 | 0 | 0 | 0 | 1 | 0 | 0 | 0 | 1 | 0 | $\overline{C_{or}}(\bar{A}\bar{B}R)$ |
| 0 | 0 | 0 | 1 | 0 | 0 | 0 | 1 | 0 | 0 | $ABF$ |
| 1 | 0 | 0 | 0 | 1 | 0 | 0 | 0 | 1 | 0 | $\bar{A}\bar{B}R$ |
| 0 | 0 | 0 | 0 | 0 | 0 | 0 | 1 | 0 | 0 | $ABCF$ |
| 1 | 0 | 0 | 0 | 1 | 0 | 0 | 0 | 1 | 0 | $\bar{A}\bar{B}\bar{C}R$ |
| 0 | 1 | 0 | 1 | 0 | 1 | 0 | 1 | 0 | 1 | $AF$ |
| 1 | 0 | 1 | 0 | 1 | 0 | 1 | 0 | 1 | 0 | $\bar{A}R$ |

INVENTOR

John G. Peddie,

BY Watson, Cole, Grindle & Watson

ATTORNEYS

INVENTOR
John G. Peddie,

BY Watson, Cole, Grindle & Watson
ATTORNEYS

INVENTOR
John G. Peddie,
BY Watson, Cole, Grindle & Watson
ATTORNEYS

REVERSIBLE BINARY CODED DECIMAL SYNCHRONOUS COUNTER CIRCUITS

This invention relates to electronic counting circuits and especially to up-down arrangements which are capable of counting in either the forward or reverse direction.

Many types of electronic counters have been described in the prior art. In general, a series of bistable or flip-flop circuits have been combined with suitable control-gating or pulse-steering circuitry so as to produce the desired counting arrangement. Basically such a system of coupled flip-flops forms a forward counting arrangement in the binary number system.

While binary indication is suitable for many uses such as scientific data gathering and processing, the decimal number system frequently is preferred in such fields as engineering data reduction and numerical control of machinery. Suitable decimal or decade counters may be constructed by modifying binary circuits, by use of feedback or cancellation paths, so as to alter the basic binary counting system. For example, a chain of four flip-flop stages, which in the unmodified condition will count from 0 to $2^4$ or 16, may be altered so as to provide a full range count of from 0 to 10. Such decade counters may employ various coding arrangements, but most frequently the natural "binary-coded-decimal" (BCD) indication is provided wherein the sum of the indications of the binary stages is the desired decimal number.

Unless further modifications are made in the logic or control gating system of the counter, such a BCD system is limited to counting in the "up" or forward direction; that is to say, the output reading or indication is increased by one unit for each input pulse which is to be counted. By additional alterations in the logic, the counter may be made to read in reverse, so that each input pulse results in unity decrease in the output indication. Very frequently it is desired that a single counter be capable of furnishing output indications in either the "up" or "down" direction. A single decade is capable, in such arrangement, of counting either "up" from 0 to 10 or "down" from 10 to 0. It will be understood, of course, that the basic bistable or flip-flop circuits are capable inherently of responding only to the presence of input pulses and that auxiliary signals are required to activate the counter in either the forward or reverse mode.

Unfortunately the modifications usually required to alter the counting system from pure binary to binary-coded-decimal, plus the logical gating needed to effect operation in either the forward or reverse direction, result in limitations on the maximum counting speed. In the usual forward-only counter the counting speed is determined primarily by the switching time or propagation delay in the input flip-flop. Because of the additional logic required, up-down counters in the prior art are limited to about one-half the inherent counting speed in the forward-only direction; that is to say, the incoming pulse rate must not exceed one-half the rated switching time of the flip-flop for reliable operation. Such a limitation effectively limits the speed of a counter rated at 10 MHz. in the forward-only direction, for example, to 5 MHz. when adapted to count in both the forward and backward directions.

In accordance with the present invention, there is provided an up-down counting circuit which is capable of counting in either the forward or reverse direction at essentially the same speed as the counter would if designed to count in the forward-only direction. Such operation is achieved by novel logic and steering circuitry wherein a combination of steering, enabling and count signals is used according to a logical design so as to minimize delay times. Speed of this novel up-down counter is defined basically by the propagation time of a single flip-flop plus the delay time of two steering gates.

Accordingly, it is an object of this invention to provide digital counting apparatus for counting electrical pulses in either the forward or reverse direction.

Another object is to provide an up-down counting arrangement in which the permissible counting rate approaches the limit set by the delay time of a single flip-flop in either the forward or reverse direction.

A still further object is to provide a reversible counting circuit in which steering gate time delays are minimized. Another object is to provide a maximum speed counter utilizing only three input control signals.

Still another object is to provide a high-speed reversible counting arrangement which is especially applicable to circuits furnishing output information in binary-coded-decimal format.

An additional object is to provide improved high-speed counting circuitry which is especially adaptable to the use of integrated semiconductor circuitry.

The novel features which are believed to be characteristic of the invention, both as to its organization and the method of operation, together with further objects and advantages thereof, will be better understood from the following description considered in connection with the accompanying drawings in which several embodiments of the invention are illustrated by way of examples. It is to be expressly understood, however, that the drawings are for purpose of illustration and description only, and are not intended as a definition of the limit of the invention.

FIG. 1 is a schematic block diagram of an up-down or forward-reverse electronic counter;

FIG. 2 shows the truth table for the switching element stages of the binary-coded-decimal counting arrangement shown in FIG. 1;

Figure 8:
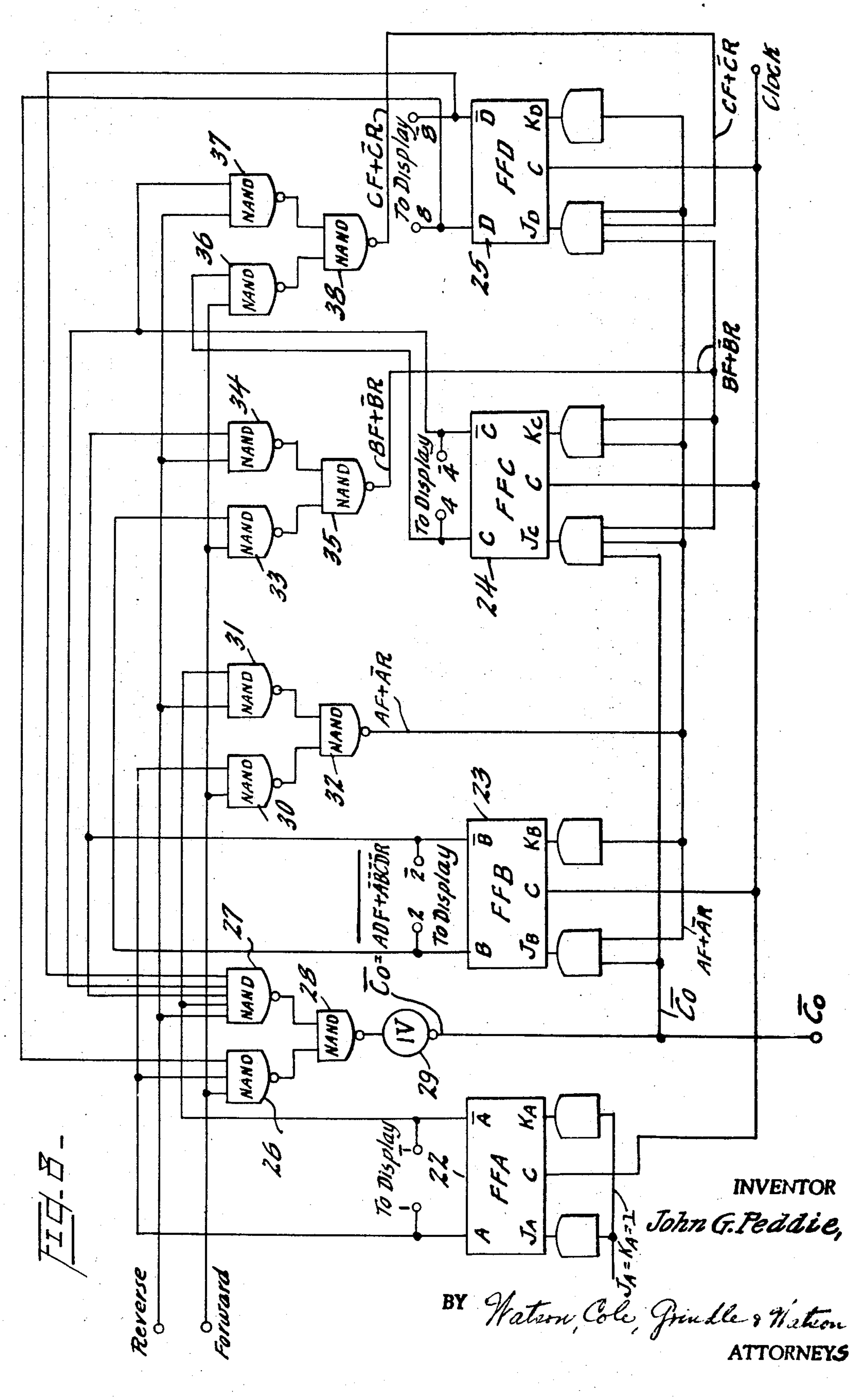
Figure 9:
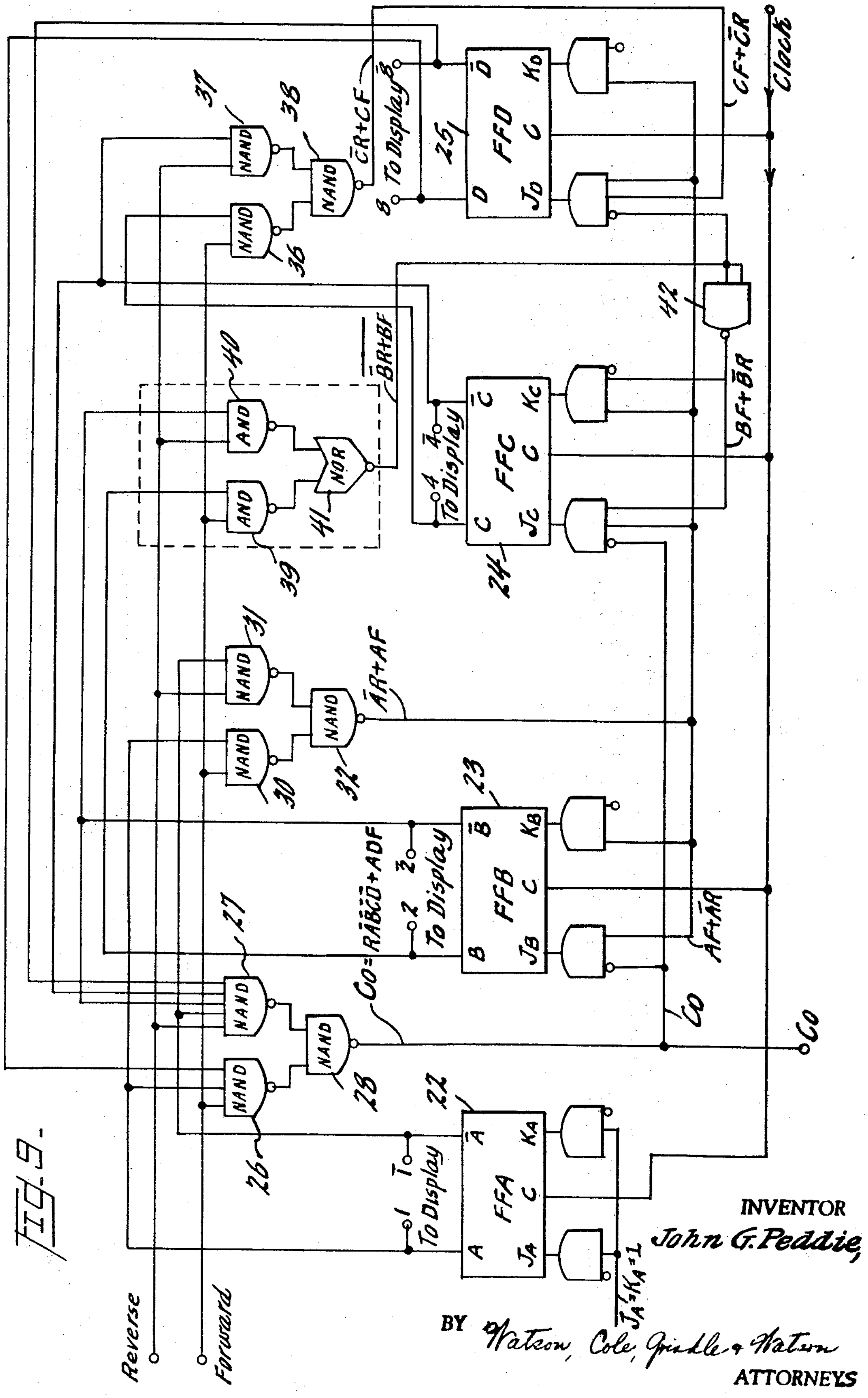

FIG. 3*a* shows the symbolic representation of the J-K type J-K the present application;

FIG. 3*b* is the truth table or set of operating rules for the J-K flip-flop as used in the synthesis of the logic circuitry;

FIGS. 4*a* and 4*b* are the truth tables for the B stage flip-flop, as utilized with simplification mapping to yield minimized logic equations for both forward and reverse modes of operation, respectively;

FIGS. 5*a* and 5*b* are the truth tables for the C stage flip-flop, used similarly to determine the minimized logic equations for both forward and reverse modes of operation, respectively;

FIGS. 6*a* and 6*b* are the truth tables for the D stage flip-flop, used in determining the minimum logic equations for both modes of operation, respectively;

FIG. 7*a* represents the truth table for the indicated flip-flop stages of the reversible counter;

FIG. 7*b* shows the truth table for the forward and reverse carry output signals as a function of a decimal number;

FIG. 7*c* illustrates the required gating conditions for the respective input gates of each stage of the reversible counter after synthesization by simplified mapping techniques;

FIG. 7*d* illustrates the required equivalent gating conditions of FIG. 7*c* after adjustment in accordance with the teachings of the invention;

FIG. 8 is the complete logic circuit for the decade up-down counting arrangement based on the adjusted logic equations shown in FIG. 7*d* and illustrating the general principles set forth by the invention; and FIG. 9 is a modification of the general circuit of FIG. 8, arranged to utilize specific available logic cards and to illustrate the application of the principle of the invention to various types of logic.

Referring to FIG. 1 of the drawing, there is shown a generalized arrangement for an up-down counter in which four stages of flip-flops 10, 11, 12 and 13 are connected to control gating circuitry 14 so as to furnish the desired output when actuated by "up" signal from terminal 16, "down" signal from terminal 17 and "pulses to be counted" at terminal 15. Basic to the counting arrangement are the four flip-flops 10, 11, 12 and 13 which bear the further designations A, B, C and D corresponding to their position in the counting chain. It will be noted that the logic circuitry associated with the control gating 14 results not only in the desired type of counting, such as BCD, but also effects the circuit alterations necessary to both up and down counting. As generalized in FIG. 1, the circuitry is applicable to binary, binary-coded-decimal or any other type of number system.

Assuming the basic circuit counts in the binary system, the required conversion logic for the BCd system is shown by way of the truth table in FIG. 2. Output pulse counts for the pure binary states are shown simply as the numbers 1 in association with decimal number columns 1, 2, 4 and 8.

The decimal output indication is the sum of the binary numbers for that particular state—for example, decimal 7 is indicated as $2^2+2^{120}$. In accordance with the novel features of this invention, the BCD output coding is produced for numbers in either the "up" (increasing) or "down" (decreasing) direction.

Although the present invention can be arranged to utilize other bistable circuits capable of being actuated in the same logical manner, for purposes of illustration the invention will be described primarily in conjunction with the J-K type flip-flop. The general symbolic representation of the J-K flip-flop is shown in FIG. 3*a* as essentially a flip-flop 19 with two multiple-input gates 20 and 21. In most integrated circuitry input gates 20 and 21 are integrated with flip-flop 19 (actually comprised of other cross-wired gates) in the same physical package. Control gating or steering signals may be applied to gates 20 and 21 in accordance with the logic design, and clock pulses or "pulses to be counted" are connected to terminal C. Output signals may be taken from terminals Q and $\overline{Q}$.

While there are some variations in the term J-K flip-flop as used in the literature and electronics industry, the particular arrangement utilized in this invention may be defined as constrained within the limits of the rules set forth in FIG. 3*b*. Any bistable device such as the electronic flip-flop has two states, conducting and nonconducting, which are defined with respect to the terminal from which the output is assumed. Following usual terminology, the nonconducting or "reset" 0 state, as well as the conducting or "set" 1 state may be regarded as occurring in response to control signals impressed on input terminals J and K which may be either "disabled" 0 or "enabled" 1. The general J-K flip-flop is characterized by a rather large number of undefined states which may exist for either J or K; such undefined or "don't care" states render the circuit quite adaptable to specialized logic applications.

Rules of operation for the J-K flip-flop, as shown in tabular form in FIG. 3*b*, may be written as follows:

a. If flip-flop is presently RESET 0 and is desired RESET 0 disable J 0 and K is undefined X;
b. If flip-flop is presently SET 1 and is desired RESET 0 enable K 1 and J is undefined X;
c. If flip-flop is presently RESET 0 and is desired SET 1 enable J 1 and K is undefined X; and
d. If flip-flop is presently SET 1 and is desired SET 1, disable K 0 and J is undefined X.

Recalling that the desired output codiing arrangement is to be "binary-coded-decimal," the BCD truth table of FIG. 2 is utilized in conjunction with the rules table in FIG. 3*b* to produce initial information for simplification mapping of the required logic operations. For stage A of the counter it is noted that the output from Q or $\overline{Q}$ switches back and forth from 0 to 1 to 0 etc. as the control gating signal applied to J or K is switched; more specifically, the output for stage A is switched by the "pulse to be counted" after the flip-flop is set or reset by the control gating signals at J or K. Thus no logic control signal is required for stage A, it being necessary only assure that J and K are held constantly enabled 1 input).

Control gating or logic signals are required, however, for flip-flops B, C and D. Considering first the "up" or forward counting logic for flip-flop B, 1 line "stage B" of the BCD table of FIG. 2 is copied as line $R_{N-1}$ of FIG. 4*a*. By application of the J-K operating rules it is now possible to write the necessary conditions for $J_{Bf}$ and $K_{Bf}$. For example, $J_{Bf}$ must be in the enabled 1 state for decimal numbers 1 and 5, disabled 0 for decimal numbers 0, 4, 8 and 9, and is undefined X for decimal numbers 2, 3, 6 and 7. Similarly, the necessary logic conditions for $K_{Bf}$ require enabled 1 for decimal numbers 3 and 7, disabled 0 for decimal numbers 2 and 6, and is undefined 0 for decimal numbers 0, 1, 4, 5, 8 and 9. Utilizing these switching requirements, the necessary logical expressions for control gating of stage B in the upward or forward direction can be determined initially by the usual mapping simplification procedures taught by Veitch, Karnough and others (see for example, "Switching Circuits for Engineers" by M.P. Marcus, 1962, Pnentice-Hall, Inc. Englewood Cliffs, N.J.). The required "up" minimum logic expressions for stage B are:

$$J_{Bf}=A\overline{D}$$
$$K_{Bf}=A$$

In a similar manner the truth table of FIG. 4*b* may be constructed for the "down" or reverse counting mode for flip-flop B. MInimum logic expressions may be determined again by mapping simplification as:

$$J_{Br}=\overline{A}(C+D)=\overline{A}D+\overline{A}C$$
$$K_{Br}=\overline{A}$$

The same truth table construction and mapping procedure may be used to determine the minimized logic for stages C and D, as shown in FIGS. 5*a*, *b* and 6*a*, *b*, respectively, resulting in equations:

$$J_{Cf}=AB$$
$$K_{Cf}=AB$$
$$J_{Cr}=\overline{A}D$$
$$K_{Cr}=\overline{A}\overline{B}$$
$$J_{Df}=ABC$$
$$K_{Df}=A$$
$$J_{Dr}=\overline{A}\overline{B}\overline{C}$$
$$K_{Dr}=\overline{A}$$

It is necessary also to include the "forward" F and "reverse" R control signals in the full logic expressions. This can be done by logical multiplication of each "up" or forward expression by F and each "down" or reverse expression by R. The complete expression for each flip-flop stage then becomes the logical sum of the up and down expressions, so that the full set of preliminary logic expressions for the counting decade is:

$$J_A=K_A=1$$
$$J_B=A\overline{D}F+\overline{A}(C+D)R$$
$$K_B=AF+\overline{A}R$$
$$J_C=ABF+\overline{A}DR$$
$$K_C=ABF+\overline{A}\overline{B}R$$
$$J_D=ABCF+\overline{A}\overline{B}\overline{C}R$$
$$K_D=AF+\overline{A}R$$

In addition the output carry function is required. For the forward and reverse directions, the output carry expressions are, respectively:

$$C_{Of}=ADF$$
$$C_{Or}=\overline{A}\overline{B}\overline{C}\overline{D}R$$

and the combined output carry expression is:

$$C_O=ADF+\overline{A}\overline{B}\overline{C}\overline{D}R$$

Due to certain characteristics of the J-K circuit configuration it is not advisable to utilize directly the logic expressions as induced above. The presence of the D variables in the expressions (other than the output carry) and the four-level expressions $\overline{A}$ (C+D)R for $J_{Br}$ would necessitate more complex gating with undesired time delays.

By inspection of the gating sequence charts shown in FIGS. 7*a*—7*d*, however, certain modifications have been discovered by the inventor which provide equivalent expressions which eliminate the D variables and reduce the four-level term for $J_{Br}$. Referring to FIG. 7c, the required gating conditions for each stage, as synthesized by way of the simplification mapping procedure, are shown. The required conditions for J and K inputs to each stage are determined by substituting numerical values from the BCD truth table (FIG. 7a) into the particular logic expression, such as $A\overline{D}F$ for control input $J_{Bf}$.

Likewise for the reverse direction, when $\overline{A}R$ is substituted for the original four-level expression $(\overline{A}C+\overline{A}D)R$ and multiplied by the inverted reverse carry output $\overline{C_{O}r}$, the resulting timing sequence is the same as for the initial mapping except that a 1 is present in state 3 (decimal number 2). By reference to the truth table for stage B, in FIG. 4b, it is seen, however, that $J_{Br}$ is undefined in state 3; therefore, the presence of a 1 in state 3 is of no consequence. In the same manner the adjusted control logic expressions for $J_{Bf}$ and $J_{Br}$ result in removal of the D and "$\overline{D}$" variables while retaining the desired sequence of timing.

Similarly the control gating function or logic expression $\overline{A}DR$ for JCr in stage C may be adjusted. When $\overline{A}\overline{B}R$ is substituted for the original expression $\overline{A}DR$ and multiplied logically by the inverted output carry $C_O r$, the resulting timing sequence remains the same except that a 1 appears in state 5 (decimal number 4). Once again, reference to the truth table of FIG. 5b shows that state 5 for JCr is undefined X and the presence of a 1 is therefore permissible.

In other words, the full set of control gating expressions, as indicated by the adjusted logic equations shown in FIG. 7d, may be used as practical equivalents of the original logic equations obtained by the simplification mapping procedure as shown in FIG. 7c. If desired, this equivalence may be confirmed by substitution and reduction of the equivalent expressions in Boolean algebra, with due allowance for the undefined states. By the above outlined adjustment procedure the control logic functions, except for the output carry, may be developed from variables A, B and C and their inverts. The full set of logic expressions for the up-down counting decade then becomes:

$$J_A=K_A=1$$
$$J_B=\overline{C_O}(AF+\overline{A}R)$$
$$K_B=AF+\overline{A}R$$
$$J_C=\overline{C_O}(ABF+\overline{A}\overline{B}R)$$
$$K_C=ABF+\overline{A}\overline{B}R$$
$$J_D=ABCF+\overline{A}\overline{B}\overline{C}R$$
$$K_D=AF+\overline{A}R$$

where $\overline{C_O}=\overline{ADF+\overline{A}\overline{B}\overline{C}\overline{D}R}$ By expansion of the expressions each of the variables can be generated separately for use as needed in the logic circuitry. The actual logic expressions used in the circuit implementation are:

$$J_A=K_A=1$$
$$J_B=\overline{C_O}(AF)+\overline{C_O}(\overline{A}R)$$
$$K_B=AF+\overline{A}R$$
$$J_C=\overline{C_O}(AF)(BF)+\overline{C_O}(\overline{A}R)(\overline{B}R)$$
$$K_C=(AF)(BF)+(\overline{A}R)(\overline{B}R)$$
$$J_D=(AF)(BF)(CF)+(\overline{A}R)(\overline{B}R)(\overline{C}R)$$
$$K_D=AF+\overline{A}R$$

where $\overline{C_O}=ADF+\overline{ABCD}R$

The complete logic circuitry resulting from the above synthesis is shown in FIG. 8 wherein the four bistable or flip-flop circuits 22, 23, 24 and 25 are actuated in proper sequence by the associated control gating and coupling circuitry. For the desired synchronous operation the "clock" pulses, which comprise the pulses to be counted, are supplied directly to each of the flip-flops 22, 23, 24 and 25. The inverted output carry $\overline{C}_o$ is developed by NAND gates 26, 27, 28 and inverter 29. Signals A, D and F are applied to multiple-input NAND gate 26 so that output results to the following NAND gate 28 when ADF is true. Similarly, signals $\overline{A}$, $\overline{B}$, $\overline{C}$, $\overline{D}$ and R are applied to multiple-input NAND gate 27 and when $\overline{A}\overline{B}\overline{C}\overline{D}R$ is true, output is sent to NAND gate 28. The resulting output from 28 thus is ADF or $\overline{A}\overline{B}\overline{C}\overline{D}R$. Inverter 29 may be a NAND gate connected as an inverter (inputs paralleled) so that the inverted output is $\overline{C}_o=\overline{ADF+\overline{A}\overline{B}\overline{C}\overline{D}R}$. This enables the control gating circuitry to be comprised solely by NAND gates. This inverted output carry is then applied to $J_B$ and $J_C$ as required by the timing sequence in FIG. 7d.

Logic expression $AF+\overline{A}R$ is developed by way of NAND gates 30, 31 and 32. Signals A and F are applied to NAND gate 30 so that output is furnished to the following NAND gate 32 when AF is true. Similarly, $\overline{A}$ and R signals are fed to the multiple-inputs of NAND gate 31, and output results when $\overline{A}R$ is true. Output from the following NAND gate 32 is thus AF or $\overline{A}R$ and is impressed on $J_B$, $K_B$, $J_C$, $K_C$, $J_D$ and $K_D$ as specified in the gating sequence of FIG. 7d.

In a similar manner logic expression $BF+\overline{B}R$ is developed by way of NAND gates 33, 34 and 35 and sent as control gating to $J_C$, $K_C$ and $J_D$ as stated in the gating chart. Likewise, the control gating signal corresponding to logic expression $CF+\overline{C}R$ is developed via NAND gates 36, 37 and 38, and sent only to control input $J_D$ of flip-flop 25 as required in the gating sequence chart of FIG. 7d.

It will be noted that a constant logical 1, equal to a fixed d.c. potential, is applied to control inputs $J_A$ and $K_A$ of input flip-flop 22. At the $J_B$ input of flip-flops 23, $\overline{C}_o$ and $AF+\overline{A}R$ are multiplied logically to furnish the full gating or control signal $\overline{C}_o(AF+\overline{A}R)$ as required in the gating sequence. Likewise, $\overline{C}_o, AF+\overline{A}R,$ and $BF+\overline{B}R,$ are logically applied at the input $J_C$ of J-K flip-flop 24 so as to produce the full control gating signal $\overline{C}_o(ABF-\overline{A}\overline{B}R)\cdot$ At the $K_C$ input to flip-flop 24, $AF+\overline{A}R$, and $BF+\overline{B}R$ are applied logically to produce the desired control gate $ABF+\overline{A}\overline{B}R$. In like manner for flip-flop 25, $AF+\overline{A}R$, $BF+\overline{B}R$, and $CF+\overline{C}R$ are applied logically to obtain the D stage control gating signal $ABCF+\overline{A}\overline{B}\overline{C}R$ Thus the adjusted logic equations set forth in the gating sequence chart of FIG. 7d are satisfied by the electrical logic in the circuit of FIG. 8.

The counter output may be taken from outputs $A,\overline{A}$; $B\overline{B}$; $C\overline{C}$; $D,\overline{D}$ as indicated in FIG. 8. Such outputs may be applied through a decoding network to provide proper signals to actuate a BCD display device. A buffer may be required to reduce the loading on the counter stages. However, since such output circuitry forms no part of the invention, it has not been shown in FIG. 8.

While the preferred implementation of the invention is shown in FIG. 8, the alternate arrangement of FIG. 9 is described primarily to illustrate that the novel features of the invention may be adapted to various types of logic by employing the principles of duality and DeMorgan's theorem. For example, the J-K flip-flops 22, 23, 24 and 25 of FIG. 9 may be the Type SN747ON, made by Texas Instruments, Inc. of Dallas, Texas, in which inverted J and K inputs are provided, as symbolized by the small circles on some of the input gate lines. In this particular example, the inverted inputs to $J_B$ and $J_C$ permit use of the straight output carry $C_O$ via NAND gates 26, 27 and 28 rather than the inverted output carry $\overline{C_O}$ as required in the circuit of FIG. 8. The control gating for input $J_C$ in flip-flop 24 must be changed, however, from the original $BF+\overline{B}R$ to the inverted $\overline{BF+\overline{B}R}$ due to the gating inversion as indicated by the small circle. Thus two AND gates 39 and 40 plus the OR-Invert 41 are required to produce the output control gating signal corresponding to logic expression $\overline{BF+\overline{B}R}$.

An additional NAND gate 42 is used as an inverter (by paralleling its inputs) to provide the required original signal $BF+\overline{B}R$ for inputs $J_C$ and $K_C$ which are not inverted inputs. NAND gate 42 may also be a normal inverter circuit. Thus the application of the principles of the invention to a mixture of logic is illustrated in the counter circuit of FIG. 9.

The decade counter shown in FIG. 9 has been constructed using Texas Instruments' Type SN747ON J-K flipflops, SN740ON Positive NAND Gates and SN745IN Two-Input AND-OR-Invert Gate. The circuit as tested had two stages of delay, with the ANDS-OR-Invert gates 39, 40 and 41 being in one package and constituting only one unit of delay. Tests indicated fully reliable operation in either forward or reverse direction up to essentially the maximum rated frequency of the flip-flops, which was 25 MHz. Outputs may be taken from the various stages as indicated and applied to any desired output circuit, such as a display device, through appropriate decoding circuitry.

The logical gating or pulse steering arrangement which is novel to this invention comprises minimization of the delay time so that propagation delay for the output carry is the same as for activation of the stage change. Therefore the output carry becomes out of coincidence with the input only by a delay time equal to the propagation delay of two gates plus one flip-flop, which makes the counter operable in forward or reverse direction at speeds near the maximum permitted by the flip-flop construction.

Although the principles of the invention have been described in connection with specific embodiments to exemplify the novel features, the principles are equally applicable to up-down counters utilizing other logics, such as negative instead of positive and use of gates other than NANDS. Application is limited only by the availability of logic "building blocks" and all such adaptations of the novel approach to minimize time delays in up-down counters are regarded as within the intended scope of the invention.

I claim:

1. A reversible synchronous counter stage for a binary coded decimal counter comprising, in combination:

four two-state elements A, B, C and D for providing the $2^0$, $2^1$, $2^2$ and $2^3$ bits, respectively, of a binary coded decimal number, said two-state elements each including first and second input gate means, common pulse input means, and first and second output means;

a forward count control line for providing forward count enabling signals;

a reverse count control line for providing reverse count enabling signals;

a pulse count line for providing pulses to be counted to each of said common pulse input means simultaneously;

first, second, third and fourth logic steering means;

said forward count control line and said reverse count control line being connected to each of said logic steering means;

said first, second, third and fourth logic steering means providing switching signals to said two-state elements in a predetermined sequence in response to predetermined output signals from said two-state elements, said forward count enabling signals and said reverse count enabling signal;

said first and second input gate means of said A two-state element are toggled; and one of said steering means provides only carry signals simultaneously to predetermined input gates of several of said two-state elements such that said counter stage counts the pulses provided on said pulse count line in a forward or reverse manner in accordance with the forward and reverse count enabling signals, respectively, and the propagation delay time of the carry signals is substantially equivalent to the switching time of said two-state elements.

2. A reversible synchronous counter stage according to claim 1 wherein said first logic steering means provides switching signals representing the carry signals for said counter stage, said first logic steering means is controlled by signals from said first and second output means of said A and D two-state elements and by signals from said second output means of said B and C two-state elements, said switching signals from said first logic steering means being applied to said first input gate means of said B and C two-state elements.

3. A reversible synchronous counter according to claim 2 wherein said second logic steering means is responsive to signals from said first and second output means of said A two-state element, said second logic steering means applying switching signals to said first and second input gate means of said B, C and D two-state elements, said third logic steering means is responsive to signals from said first and second output means of said B two-state element, said third logic steering means providing switching signals to said first input means of said C and D two-state elements and to said second input gate means of said C two-state element, said fourth logic steering means is responsive to signals from said first and second output means of said C two-state element, said fourth logic means providing switching signals to said first input means of said D two-state element.

4. The reversible synchronous counter stage according to claim 2 wherein said first, second, third and fourth logic steering means each include forward steering means, reverse steering means, and output gating means responsive to the outputs from both said forward steering means and said reverse steering means whereby the output of said output gating means comprises said switching signals.

5. A reversible synchronous counter stage according to claim 4 wherein said forward and reverse steering means and said output gating means of each of said second, third and fourth logic steering means comprise two-input NAND gates.

6. A reversible synchronous counter stage according to claim 5 wherein said second, third and fourth logic forward steering NAND gates are responsive to said forward count enabling signals said second, third and fourth logic reverse steering NAND gates are responsive to said reverse count enabling signals, said second, third and fourth logic forward steering NAND gates are additionally responsive to signals from said first output means of said A two-state element, said B two-state element and said C two-state element, respectively, and said second, third and fourth logic reverse steering NAND gates are additionally responsive to signals from said second output means of said A two-state element, said B two-state element and said C two-state element, respectively.

7. A reversible synchronous counter stage according to claim 4 wherein said first logic forward steering means comprises a three-input NAND gate receiving forward count enabling signals from said forward count control line and the output from said first output means of said A and D two-state elements, said first logic reverse steering means comprises a five-input NAND gate receiving inputs from said reverse count control line and said second output means of said A, B, C and D two-state elements, said first logic steering output gating means includes a NAND gate receiving the outputs from said three-input NAND gate and said five-input NAND gate, said first logic steering output gating means further includes a NAND gate having its inputs paralleled and responsive to said previous mentioned NAND gate for providing said carry output signals.

8. A reversible synchronous counter stage according to claim 7 wherein all of said two-state elements are J-K type flip-flop circuits.

9. A reversible synchronous counter stage according to claim 4 wherein said four two-state elements are J-K type flip-flop circuits and predetermined ones of said first and said second input gate means include integral inverter means and said forward and reverse steering means and said output gating means of said second and fourth logic steering means comprise two-input NAND gates.

10. A reversible synchronous counter stage according to claim 9 wherein said forward steering means and said reverse steering means of said third logic steering means comprise AND gates, said forward steering AND gate means receiving inputs from said forward count control, said reverse steering AND gate means receiving inputs from said reverse count control line and said second output means of said B two-state element, said third logic steering output gating means including a NOR gate and a NAND gate, said NOR gate being responsive to the output signals from said forward and said reverse steering AND gates, said NAND gate having paralleled inputs and being responsive to the output from said NOR gate, and said NAND gate being connected to said first and said second input gate means of said C two-state element.

11. A reversible synchronous counter stage according to claim 9 wherein said forward steering means, said reverse steering means and said output gate means of said first logic steering means comprise a three-input NAND gate, a five-input NAND gate and a two-input NAND gate, respectively, said three-input NAND gate receiving inputs from said forward count control line and said first outputs means of said A and D two-state elements, said five-input NAND gate receiving inputs from said reverse count control line and said second output means of said A, B, C and D two-state elements.